Jan. 25, 1966  M. E. PHILLIPS, JR., ETAL  3,231,062
BAKERY GOODS PACKER
Filed April 5, 1963  4 Sheets-Sheet 1
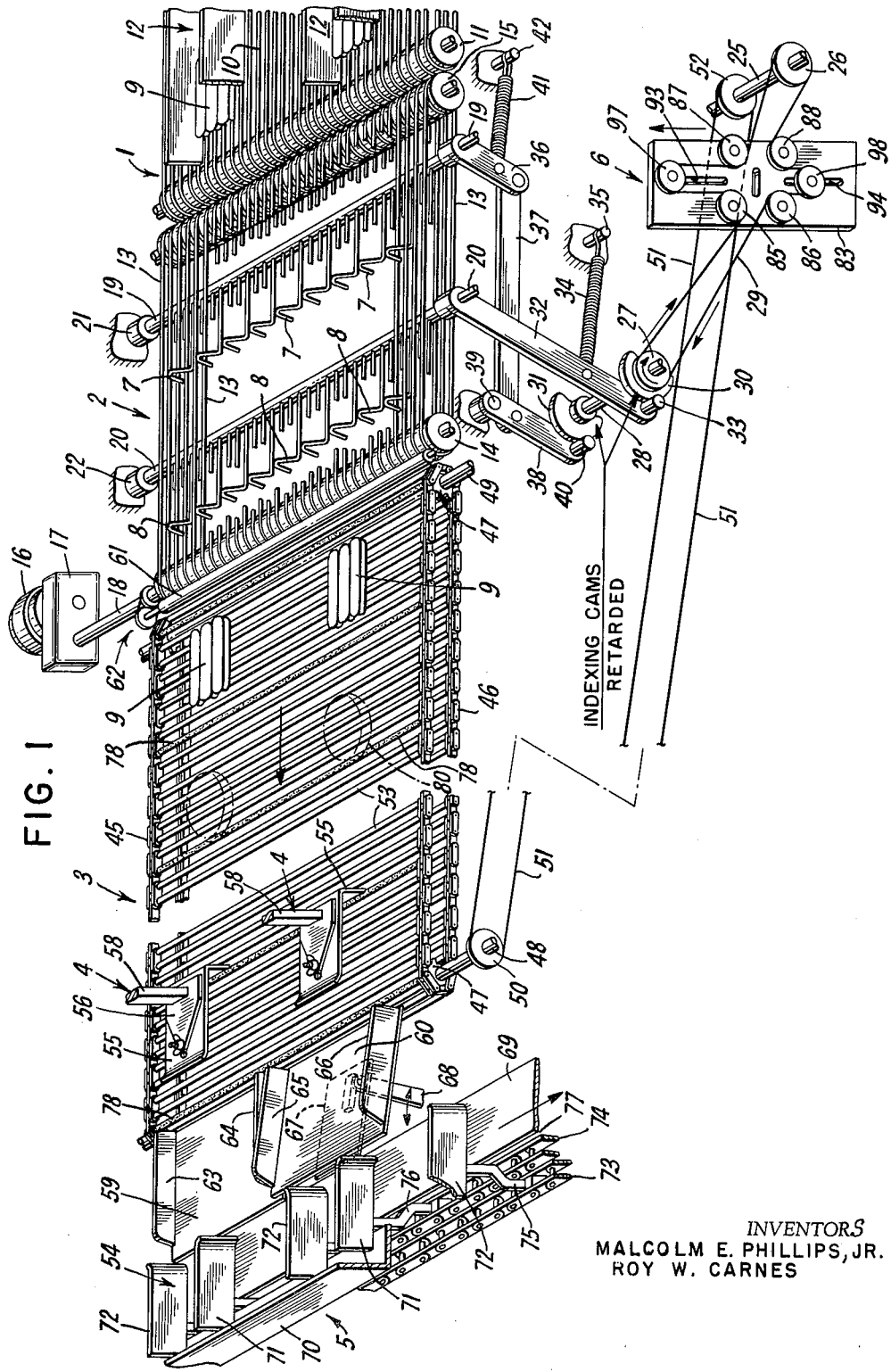
FIG. I
INVENTORS
MALCOLM E. PHILLIPS, JR.
ROY W. CARNES Jan. 25, 1966  M. E. PHILLIPS, JR., ETAL  3,231,062
BAKERY GOODS PACKER
Filed April 5, 1963  4 Sheets-Sheet 2
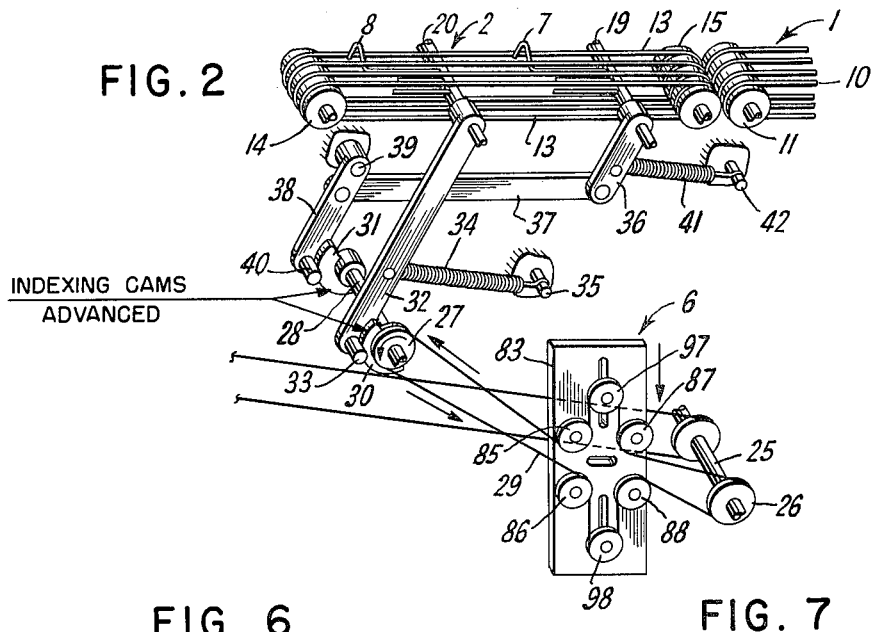
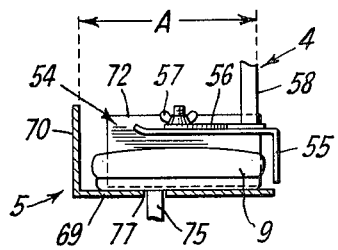
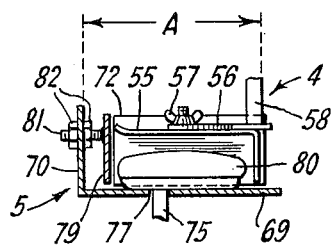
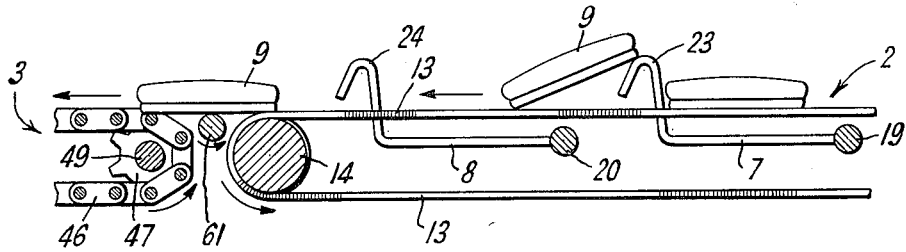
INVENTORS
MALCOLM E. PHILLIPS, JR.
ROY W. CARNES

INVENTORS
MALCOLM E. PHILLIPS, JR.
ROY W. CARNES

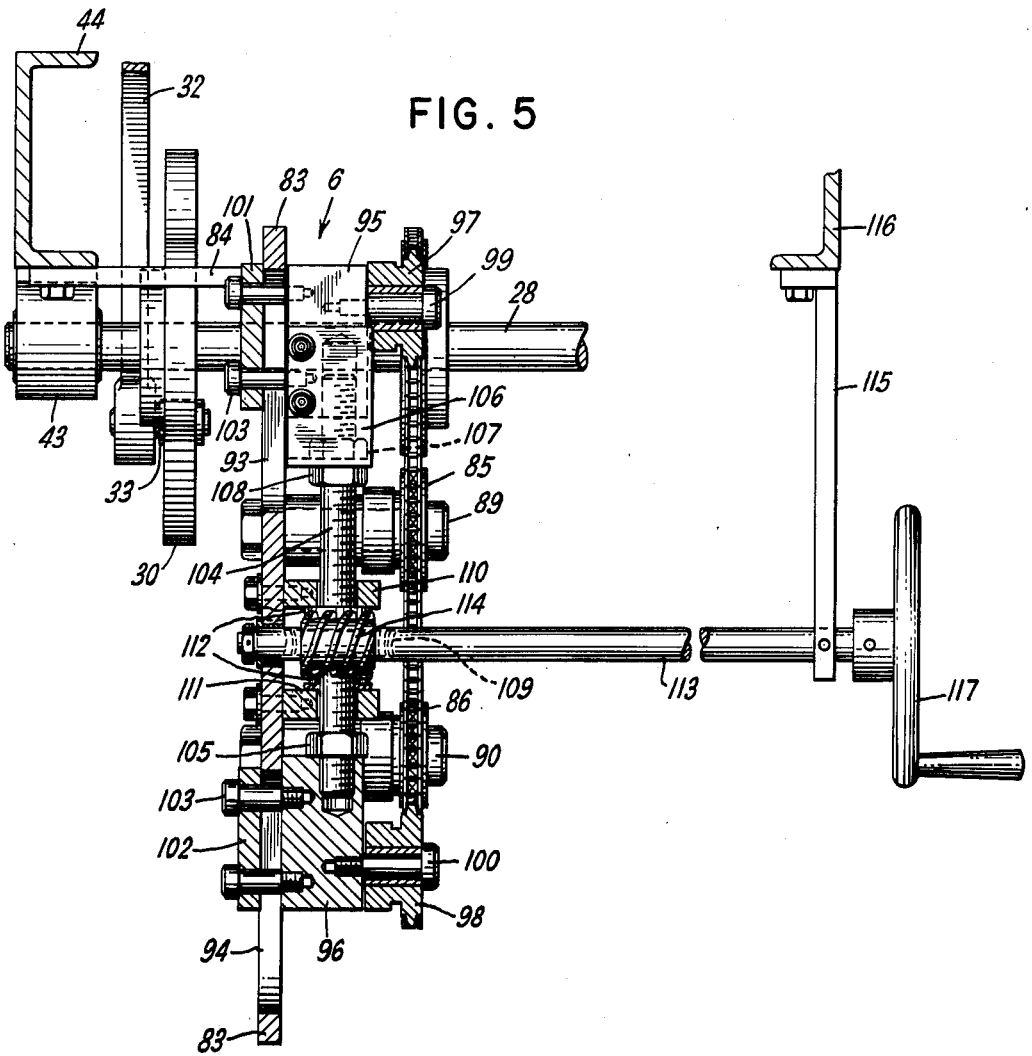

United States Patent Office 3,231,062
Patented Jan. 25, 1966

3,231,062
BAKERY GOODS PACKER
Malcolm E. Phillips, Jr., and Roy W. Carnes, Richmond, Va., assignors to American Machine & Foundry Company, a corporation of New Jersey
Filed Apr. 5, 1963, Ser. No. 270,943
6 Claims. (Cl. 198—34)

This invention relates to the handling and packing of articles, particularly baked articles such as buns, rolls and the like.

In a machine for packing hot dog and hamburger rolls and other loose bakery products, it is necessary to meter a given number of these products in groups, or individually, from an incoming conveyor onto another conveyor where subsequent operations may be performed on the products. Also, it is necessary to secure accurate placement of the products to satisfy the timing requirements of subsequent operations, for example, the stacking of two groups of metered products on a conveyor leading to a packaging machine. Furthermore, it is necessary to permit correction or adjustment of such timed placement of articles while the machine is in operation.

Accordingly, it is an object of this invention to provide apparatus for continuously and automatically metering baked products in a packaging machine.

Another object of the invention is to provide metering means for accurately placing baked articles on a conveyor in timed relationship to subsequent operations to be performed on the articles.

A further object is to provide means for adjusting the speed and the phase of said metering means relative to said conveyor whereby to accommodate articles of different size without remodeling or redesigning the drives for said metering and conveying means.

Still another object is to provide means for metering bakery products automatically and continuously from longitudinal rows of said products on a supply conveyor.

With the foregoing and other objects in view, the apparatus of the present invention includes a supply conveyor which delivers baked products in one or more longitudinal rows to a metering or indexing conveyor. The indexing conveyor is comprised of a plurality of endless helical springs trained around a pair of multi-grooved pulleys. Disposed between the springs are a plurality of indexing fingers arranged in two transverse rows. These fingers are mounted on rock shafts and means are provided to intermittently and periodically raise them above the top of the spring conveyor for a predetermined duration whereby the first row of fingers arrests the incoming rows of articles whilst a metered number of articles in each row having passed said first row of fingers is arrested by the second row of fingers. During the interval while the fingers are depressed in their cycle of operation, the products metered between the two rows of fingers are delivered to another conveyor operated in timed relationship with said indexing fingers.

The phase of the operating cycle of the indexing fingers may be advanced or retarded relative to the conveyor receiving the metered products by means of a phase changer located in the drive transmission of the indexing fingers. The indexing fingers and the metered product conveyor are driven from a common drive shaft through separate transmissions. The metered product conveyor delivers the products beneath oscillatory pusher plates which push the products into the flight cavities of a conveyor which delivers the products to a wrapping machine.

The objects and advantages of the invention, as well as the features of construction, arrangement and combination of the parts thereof, will become apparent from the following description of a preferred embodiment with reference to the accompanying drawings wherein:

FIG. 1 is a fragmentary perspective view, partly diagrammatic, of the apparatus of the present invention;

FIG. 2 is a fragmentary view of the indexing fingers phase changer moved to advanced position;

FIG. 3 is a fragmentary side elevation of the indexing fingers, spring conveyor and metered product conveyor, illustrating the metering of a baked product;

FIG. 5 is a transverse vertical section taken on the line 5—5 of FIG. 4;

FIG. 6 is a sectional detail of the product pusher and its associated conveyor flight; and FIG. 7 is a modification of the detail of FIG. 6.

Figure 4:
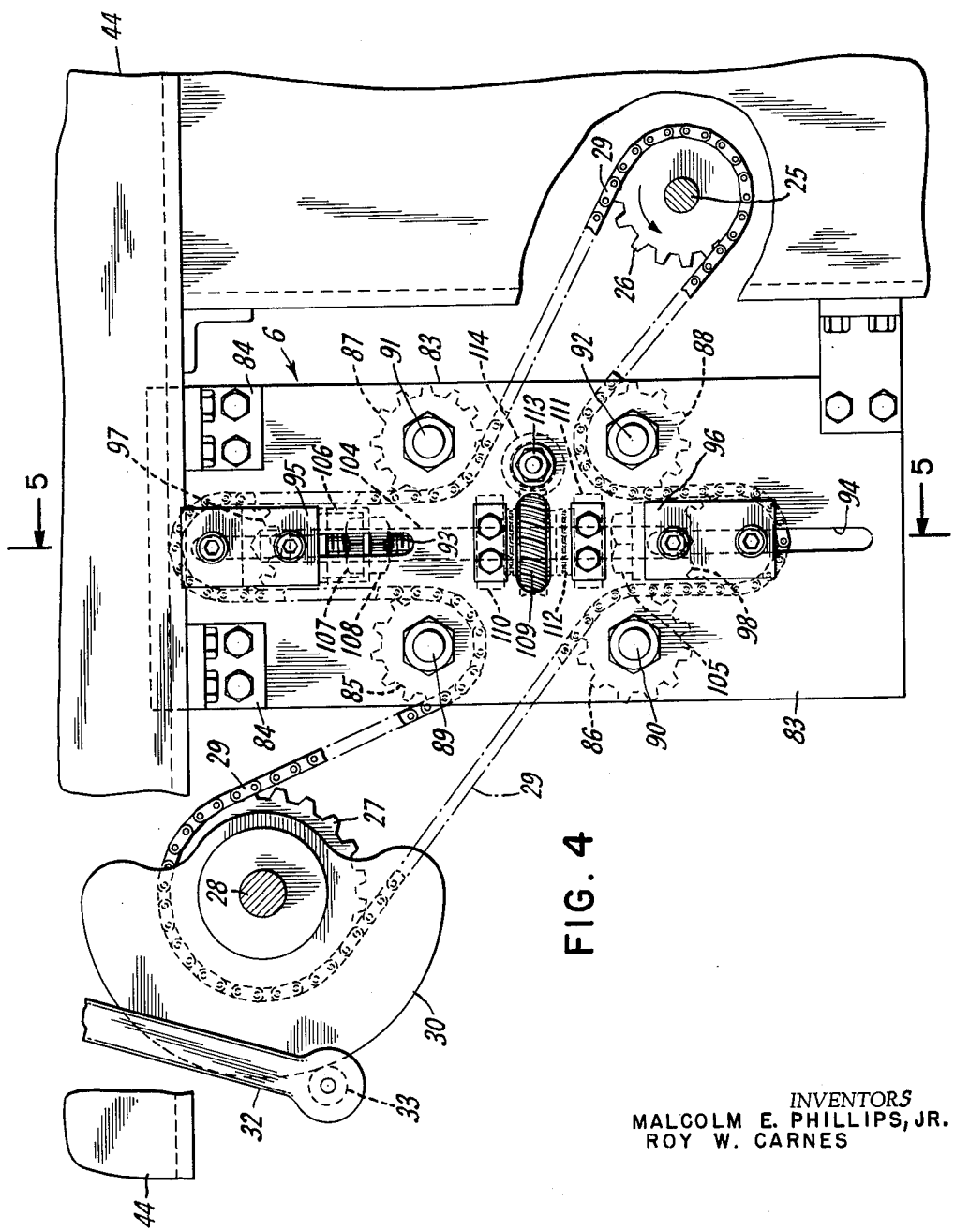
FIG. 4 is an enlarged elevation of the phase changer.

Referring to FIG. 1, the feeding, indexing and packing apparatus includes a supply or infeed conveyor 1, a metering conveyor 2 with transverse rows of indexing fingers 7, 8, a rod conveyor 3 for receiving and forwarding metered products, pushers 4 for removing products from conveyor 3, a conveyor 5 for receiving metered products from said pushers, and a phase changer 6 for varying the timing of the indexing fingers 7, 8 with respect to the rod conveyor 3.

The supply conveyor 1, shown as delivering hot dog rolls 9, is comprised of a plurality of endless helical springs 10 trained around a pair of transverse multi-grooved pulleys, only one 11 of which is shown. Associated with the conveyor 1 are two chutes 12 each of which is shown channeling three abutting longitudinal rows of hot dog rolls 9 toward the metering conveyor 2. This arrangement of rolls is illustrative only, as the number of chutes and rows per chute may be varied as desired. As shown the group of rolls metered from one chute will constitute the bottom layer, the group metered from the other chute the top layer, of the finally packaged product. The method and apparatus for delivering rolls 9 to the chutes 12 of conveyor 1 is not described herein as it forms no part of the present invention. For a detailed description and showing thereof see the co-pending application of Fred D. Marasso and Malcolm E. Phillips, Jr., Serial No. 169,398, filed January 29, 1962, now Patent No. 3,180,476, entitled "Corrector for Misaligned and Overturned Rolls."

As shown in FIG. 1, the conveyor 1 delivers the rolls 9 to the metering conveyor 2. This conveyor is comprised of a plurality of endless helical springs 13 trained around transverse multigrooved pulleys 14 and 15, pulley 14 being the driving pulley and in turn being driven through a variable speed drive 17 coupled to a shaft 18 on which pulley 14 is mounted.

Referring to FIGS. 1, 2 and 3, transverse rods 19 and 20 extend between the laps of the spring conveyors 13, and are suitably journalled at 21 and 22 in the machine frame. These rods 19 and 20 serve as rocker shafts and mount the plurality of indexing fingers 7 and 8, respectively. Indexing fingers 7 and 8 are transversely aligned and respectively define first and second rows of indexing fingers.

Referring to FIGS. 1 and 3, it is seen that indexing fingers are identical in construction. It is preferable that an indexing finger 7 or 8 be provided between each vicinal pair of conveyor springs 13. Each finger is rod-like and extends forwardly (in the direction of conveyor travel) from its rock shaft between the laps of the conveyor springs 13, and terminates in an upwardly extending portion 23 (finger 7) or 24 (finger 8) which is smoothly bent down at its extremity to prevent damage to the rolls 9 being metered.

Referring to FIGS. 1 and 2, rock shafts 19 and 20 are intermittently and individually oscillated and receive their motion from a drive shaft 25 suitably coupled (not shown) to the main drive of the packaging machine. Shaft 25 mounts a sprocket 26 which is coupled by a sprocket chain 29 to a sprocket 27 mounted on a cam shaft 28. In FIG. 5, cam shaft 28 is shown as journalled in a bearing 43 mounted on a channel member 44 of the machine frame. The chain 29 is trained through the phase changer 6 for a purpose to be described hereinafter.

Cam shaft 28 mounts cams 30 and 31 which impart intermittent oscillations to their respectively associated shafts 20 and 19. An arm 32 is fixed to one end of shaft 20 and carries at its free end a cam follower 33 which is biased against cam 30 by a tension spring 34 working between follower arm 32 and a post 35 on the machine frame. Fixed to one end of shaft 19 is an arm 36 connected through a link 37 to an arm 38 pivoted at one end 39 to the machine frame. The free end of arm 38 carries a cam follower 40 which is biased against cam 31 through the agency of a tension spring 41 acting between arm 36 and a post 42 on the frame of the machine.

The cycle of operation of the indexing fingers 7 and 8 by means of cams 31 and 30 is such that for a portion of one revolution of cam shaft 28 the fingers 7 and 8 are in the position shown in FIG. 3, and for the remaining portion of one revolution of cam shaft 28, the indexing fingers 7 and 8 are completely below the top lap of spring conveyor 2, thereby permitting unimpeded passage of rolls 9.

The metering of the rolls 9 is achieved as follows. The rolls 9 are delivered to the metering conveyor 2 in longitudinal rows, the products in each row being in contact and each row approaching as a unit. Upon arrival at the first indexing fingers 7, assuming said fingers as dwelling in the up position (FIG. 3), the rows are halted momentarily with the conveyor springs 13 slipping underneath the rolls until the fingers 7 and 8 drop. With the fingers dwelling in the down position, one (as shown) or more products 9 from each row is allowed to pass before the fingers rise again. When the fingers rise, the trailing end of the metered product 9 (or group of products) is slightly bumped to insure that the rising fingers 7 come up in front of the oncoming products and effect a positive separation (FIG. 3). The metered rolls 9 are carried forward until stopped by the second row of fingers 8. The space between the two rows of metering fingers is sufficient to accommodate the largest combination of rolls to be handled. The usual timing relationship between the rows of fingers 7 and 8 is that they preferably drop at about the same time, and the first row of fingers 7 returns to raised position slightly earlier than fingers 8 to effect the bumping action described above. Wide latitude is afforded by the selection of the "down time" parameter.

On the succeeding cycle the second row of fingers 8 drops and allows the previously metered roll 9 (or group of rolls) to pass onto conveyor 3 and, simultaneously, the first row of fingers 7 drop and repeat the operation described above.

A bridging roller 61 is disposed in the space between conveyors 2 and 3 and is driven from shaft 18 by a sprocket and chain assembly 62.

To meter a given length of product during the "down time" fraction of the cycle of operation of indexing fingers 7 and 8, the speed of the conveyor in inches per cycle must be the reciprocal of that fraction multiplied by the product length in inches. Assuming a "down time" of one-third of a cycle, the speed of the metering conveyor 2 must be three times the length of product metered per cycle.

Conveyor 3 (which receives the metered rolls 9 from metering conveyor 2), associated pushers 4 and conveyor 5 are of the type fully described and illustrated and their operation explained in the copending application of Fred D. Marasso and Robert E. Rademacher, Serial No. 790,420, filed February 2, 1959, now Patent No. 3,106,048 entitled "Bun Depanning and Packaging Machine." Only so much thereof will be described herein as is necessary to an understanding of the present invention, and reference is made to the aforesaid application for a more detailed showing and explanation.

The conveyor 3 consists of a pair of laterally spaced endless chains 45 and 46 extending around sprockets 47 mounted on transverse shafts 48 and 49. Shaft 48 is the driving shaft and one end is extended and mounts a sprocket 50 which is coupled by a chain 51 to a sprocket 52 mounted on the same shaft 25 from which indexing fingers 7 and 8 of metering conveyor 2 are actuated as described above.

The conveyor chains 45 and 46 carry a plurality of evenly spaced transverse rods 53. The rolls 9 on conveyor 3 may be carried through a slicing operation (not shown but see aforesaid application, Serial No. 790,420). At the exit end of conveyor 3, pushers 4 drop behind the rolls 9 and push them into a waiting box or flight cavity 54 of conveyor 5 which delivers the rolls to a wrapping machine (not shown).

Each pusher 4 comprises a pusher plate 55 adjustably mounted to a supporting plate 56 by means of wing nuts 57. The supporting plate 56 is integral with an upright lug 58 which is coupled to mechanism for operating the pusher, all as described in the aforesaid copending application Serial No. 790,420, now Patent No. 3,106,048. Briefly, the pushers 4 are operated in timed relationship with the conveyor 3 so that the pusher plates 55 momentarily dwell in a backmost and raised position (FIG. 1) at the forward end of the conveyor 3. As a metered roll or series of rolls 9 pass underneath, the pushers 4 are lowered and immediately moved in a forward direction so that the downwardly projecting portion of each pusher plate 55 engages the trailing end of the rolls 9 and pushes them rapidly forward over bridge plates 59 and 60 into a chute 54 (or a box in said chute) of conveyor 5 which is momentarily stopped to permit insertion of the rolls 9 therein. After inserting the buns or rolls 9 into the conveyor chutes, the pushers 4 are immediately raised and moved backward to their starting position to engage a succeeding metered group of rolls 9.

The bridge plates 59 and 60 are stationary. Bridge plate 59 is provided with guide rails 63 and 64 and bridge plate 60 with rails 65 and 66. Bridge plate 59 is horizontal and forms a guide channel for buns or rolls 9 to be dispensed to the bottom of a chute 54, while bridge plate 60 is inclined for guiding rolls for delivery on top of a first layer of rolls in a chute 54. In order to prevent any tumbling of the second layer of rolls and damage thereto while being pushed on top of the first layer, the bridge plate 60 is provided with an oscillating shuffle plate 67 which during roll insertion emerges from beneath bridge plate 60 to form an extension of the latter, thus providing a smooth bridge from the leading edge of plate 60 to a point about half way over the layer of rolls 9 already in a chute 54. The shuffle plate 67 is withdrawn before pusher 58. The shuffle plate 67 is connected to an oscillatable bar 68 and is actuated as described in the aforesaid application Serial No. 790,420, now Patent No. 3,106,048.

The conveyor 54 may be of an suitable construction. As shown in FIGS. 1, 5 and 6 the conveyor is comprised of a fixed horizontal bottom plate 69 and a vertical back plate 70 integral with said bottom plate. The baked articles which are received in flights 54 are conveyed thereby slidingly along the conveyor bottom plate 69 and forwarded to a wrapping machine (not shown). Each chute is comprised of a pair of spaced walls 71 and 72 extending transversely of the conveyor and movable along the conveyor. Suitable means for moving the walls 71 and 72 along the conveyor 5 are shown as endless chains 73 and 74 which mount rods 75 and 76 extending upwardly through a continuous longitudinal slot 77 in the base of the conveyor. The flight walls 71 and 72 are mounted on the rods 76 and 75, respectively. Means are also provided for arresting the movement of each flight 54 when it is indexed with each of the bridge plates 59 and 60, in synchronism with the delivery of rolls by the pushers 4. As stated, various types of conveyor may be used and further description is not necessary, since such conveyors are well known in the art and form no part of the present invention.

Returning to the transverse rod conveyor 3 (FIG. 1), it is shown as marked at equal intervals by means of colored rods 78. This conveyor is timed with the pushers 4 so that the pusher plates 55 drop in a predetermined relationship with these reference rods. This means that if a roll or group of rolls 9 are appropriately located between these reference rods 78, assurance is provided that the pushers will not drop on the product and damage same. This affords a convenient means of visually checking the location of product groups or rolls 9 immediately after metering them from conveyor 2.

The extreme position of each pusher 4 is fixed in relation to the roll feed into the conveyor 5 (FIG. 6) and a fixed distance A serves as a reference for the location of pusher plate 55. Each different product and/or grouping arrangement usually requires a different set of pushers 4. However, the present pusher construction permits adjusting the pusher plate 55 with its back wall in any desired location relative to the pusher mechanism and thus extends the range of product size beyond that which could be accommodated through compromise. This technique is supplemented by the use of an auxiliary "back-up plate" 79 on the conveyor 5 (FIG. 7) which reduces the distance the pusher plates 55 need to be advanced to handle extremely short products, such as a hamburger roll 80 (see also FIG. 1). Referring to FIG. 7, the auxiliary "back-up plate" 79 may be adjustably mounted conveniently on conveyor back plate 70 by means of a stud 81 extending from the plate 79 thorugh plate 70 and adjustably secured to the latter by a pair of lock nuts 82. The auxiliary plate 79 also permits using a single adjustment of the pair of pushers 4 to handle more than one product length, i.e., with and without the back-up plate 79. These devices accomplish the goal of handling a variety of products with no sacrifice in precise placement of the products on the conveyor 3.

In connection with the foregoing, by comparing the position of the pusher plate 55 in FIGS. 6 and 7 and noting their relation to the colored reference rods 78 (FIG. 1) it is readily seen that placement of a product such as a hot dog roll 9 or hamburger roll 80 with respect to such reference rods 78 on conveyor 3 must vary depending on the adjustment of pusher plate 55 and, if used, the auxiliary back-up plate 79. As previously explained, the pusher plate adjustment and the optional use of the back-up plate depend upon the product size and/or arrangement. Therefore, the indexing fingers cam shaft 28 and rod conveyor 3 must have a phase relationship such that the second indexing fingers 8 drop at a time which allows the product to move, at a velocity dictated by the speed of the indexing conveyor 2, on to the rod conveyor 3 between a pair of reference rods 78. As mentioned above, the pusher 4 drops in fixed relationship to the conveyor reference rods 78. Obviously, if the metering or indexing conveyor 2 is moving fast, as when metering a relatively long product 9, the leading edge of the product 9 will reach the conveyor 3 sooner than if metering a short product 80; therefore, the two products would be deposited in different positions relative to the reference rods 78.

The requirement for a variable product position on the conveyor 3 is met by advancing or retarding the cam operated indexing fingers 7 and 8, thereby to alter the phase relationship between the rod conveyor reference rods 78 and the indexing fingers 7 and 8. This is accomplished by driving the indexing fingers cam shaft 28 through the phase changer 6.

Referring to FIGS. 1, 2, 4 and 5, the phase changer includes a vertical rectangular plate 83 mounted on brackets 84 extending from machine frame channel member 44. Four sprockets 85, 86, 87 and 88 are mounted on the plate 83, sprockets 85 and 86 having vertically aligned shafts 89, 90 extending from plate 83 and being located near one vertical edge of said plate, the sprockets 87 and 88 having similarly aligned shafts 91, 92 near the other vertical edge of the plate 83. The arrangement of these sprockets is such that they define the corners of a rectangle.

Plate 83 is also provided along its vertical centerline with a pair of vertically extending slots 93, 94. Overlying these slots on the sprocket mounting face of the plate 83 are a pair of slidable blocks 95, 96 on which are mounted sprockets 97 and 98, respectively, with vertically aligned shafts 99, 100 (FIG. 5). Overlying the slots 93 and 94 on the rear face of plate 83 are the slidable plates 101, 102 secured to the blocks 95 and 96 by means of machine screws 103 extending through the slots 93, 94. This in effect clamps plate 83 between plates 101, 102 and blocks 95, 96; however, the arrangement is such to permit the plates 101, 102 and blocks 95, 96 to slidably reciprocate vertically along plate 83; the slots 93 and 94 serving as guides for the screws 103. Thus sprockets 97 and 98 are also vertically reciprocable with their mounting blocks 95 and 96.

Extending between blocks 95 and 96 and threaded thereinto is an elongated stud 104. The stud is adjustably secured in block 96 by means of a lock nut 105. Depending from upper block 95 is an integral U-shaped bracket 106 through which stud 104 passes and is adjustably secured thereto by means of lock nuts 107 and 108. The upper end portion of stud 104 is threaded oppositely of the remainder of the stud. This arrangement permits adjustably locking the centers of sprockets 97 and 98 at any desired vertical spacing whereby the sprockets 97 and 98 may be reciprocated vertically while maintaining a fixed distance between their centers.

A worm gear 109 is threaded on an intermediate portion of stud 104 and is restrained against vertical displacement by adjustable clamps 110 and 111 extending from plate 83 and provided with bores which loosely receive stud 104 therethrough. Thrust bearings 112 are interposed between the clamps 110, 111 and the faces of the worm gear 109. Journaled in plate 83 is a horizontal shaft 113 extending perpendicularly from plate 83 and mounting a worm 114 meshed with worm gear 109. The outer end portion of shaft 113 is journaled through a bracket 115 depending from a machine frame element 116. A hand wheel 117 is mounted on the end of shaft 113.

The drive chain 29 between the power input shaft 25 and cam shaft 28 is threaded around the six phase changer sprockets 85, 86, 87, 88, 97 and 98 as shown, completing the drive between the two shafts. Rotation of hand wheel 117 will cause stud 104 to move up or down depending on the direction of rotation of the handwheel 117, and this will cause sprockets 97 and 98 to move up or down as a unit.

If sprockets 97 and 98 are moved up as a unit, chain 29 is relinquished at the bottom and taken up at the top of the phase changer causing the cam shaft 28 to rotate clockwise (FIG. 1) relative to the input shaft 25. The reverse is true when the movable sprockets 97 and 98 are moved down (FIG. 2). The arrows shown on the chain 29 from the phase changer 6 and the arrows shown on the cam 30 in FIGS. 1 and 2 refer only to the relative motion of these elements brought about by operating the phase changer 6. During operation of the machine the cams 30 and 31 are driven by the phase changer chain 29 from the power input shaft 25 which runs continuously in a conuterclockwise direction as viewed in FIGS. 1 and 2. The effect of operating phase changer 6 up (FIG.

1) or down (FIG. 2) is to respectively retard or advance the phase of the indexing finfers (7, 8) cycle relative to the colored reference rods 78 on the transverse rod conveyor 3.

Sprockets 85, 86, 87 and 88 of the phase changer should be located so that the two portions of chain 29 leaving each of the movable sprockets 97 and 98 are parallel. This provides mathematical exactness, insuring that the length of chain taken up is precisely the same as that given out, avoiding the need for any spring-loaded chain tensioners. Initial tension in the chain is established by moving sprockets 97 and 98 apart as far as necessary and locking their respective mounting blocks at the desired sprocket spacing through means already described.

By making use of the phase changer 6, it is possible to deposit the products 9 or 80 at any desired location relative to the reference rods 78 of the conveyor 3 and thus in the correct location with respect to the pusher plates 55. This phase changing operation can be performed either while the machine is stationary or running.

There has been described an apparatus which provides a completely flexible method of metering a vast array of bakery product sizes and shapes in any practical grouping arrangement. The product is positively and gently handled at speeds consistent with other related production equipment. Thus, a satisfactory operating system is provided to accomplish the stated objects of the invention.

We claim:

1. In apparatus for handling and packing baked products, a first conveyor adapted to deliver said products in abutting alignment longitudinally of said first conveyor, a second conveyor aligned with said first conveyor and adapted to receive said products continuously from said first conveyor, metering means operatively associated with said second conveyor for subdividing said aligned products into longitudinally spaced predetermined lengths, a third conveyor aligned with said second conveyor for receiving said metered product lengths from said second conveyor, a fourth conveyor disposed at the discharge end of said third conveyor and movable transversely of said third conveyor, product pushers operatively mounted above said third conveyor to intermittently deliver metered product lengths from said third conveyor to said fourth conveyor, and means for operating said product metering means in phase with said third conveyor.

2. The combination according to claim 1, including means for altering the operating phase of said metering means in relation to said third conveyor.

3. The combination according to claim 1, in which said second conveyor is comprised of a plurality of transversely spaced conveyor elements, the product metering means including a plurality of indexing members oscillatably mounted between said conveyor elements, said indexing members being disposed in first and second transverse rows spaced longitudinally of said second conveyor, means for intermittently oscillating said rows of indexing fingers in synchronism between upper and lower limiting position, said indexing fingers being adapted to arrest product travel in the upper limiting position and permit unimpeded product travel in the lower limiting position, and means for oscillating said indexing fingers in timed relationship to the speed of the third conveyor.

4. The combination according to claim 3, including means for momentarily advancing or retarding the timed relationship of the oscillatable indexing fingers to the speed of the third conveyor.

5. The combination according to claim 4, in which the pusher includes a product pusher plate reciprocable longitudinally and vertically of the third conveyor in timed relationship therewith, and including means for adjusting the limiting horizontal positions of said pusher plate.

6. The combination according to claim 5, in which the third conveyor is provided with transverse longitudinally spaced product position reference lines.

References Cited by the Examiner
UNITED STATES PATENTS

| | | | |
|---|---|---|---|
| 1,746,383 | 2/1930 | Deakin | 198—189 |
| 2,212,348 | 8/1940 | Ludington | 72—242.8 |
| 2,341,705 | 2/1944 | Fedorchak | 198—34 |
| 2,403,673 | 7/1946 | Mead | 198—34 |
| 2,751,066 | 6/1956 | Lorig | 198—193 |
| 2,873,845 | 2/1959 | Kross | 198—24 X |
| 3,080,042 | 3/1963 | Sherman | 198—34 |

FOREIGN PATENTS 659,117  10/1951  Great Britain.

SAMUEL F. COLEMAN, *Primary Examiner.*

EDWARD A. SROKA, *Examiner.*